United States Patent
Ciavarella

(10) Patent No.: US 7,431,182 B2
(45) Date of Patent: Oct. 7, 2008

(54) DISPENSER WITH SUCTION CHAMBER

(76) Inventor: Nick E. Ciavarella, 921 Justo La., Seven Hills, OH (US) 44131

( * ) Notice: Subject to any disclaimer, the term of this patent is extended or adjusted under 35 U.S.C. 154(b) by 454 days.

(21) Appl. No.: 10/993,807

(22) Filed: Nov. 20, 2004

(65) Prior Publication Data

US 2006/0108380 A1    May 25, 2006

(51) Int. Cl.
*B65D 88/54* (2006.01)
(52) U.S. Cl. .................... 222/321.9; 222/190
(58) Field of Classification Search ... 222/321.7–321.9, 222/628, 189.1, 372, 383, 383.1, 384, 190, 222/108
See application file for complete search history.

(56) References Cited

U.S. PATENT DOCUMENTS

| | | | | |
|---|---|---|---|---|
| 3,759,426 A | * | 9/1973 | Kane et al. | 222/385 |
| 4,932,567 A | * | 6/1990 | Tanabe et al. | 222/190 |
| 5,048,750 A | * | 9/1991 | Tobler | 222/190 |
| 5,065,910 A | | 11/1991 | Fiedler | 222/504 |
| 5,115,945 A | | 5/1992 | Ruck | 222/96 |
| 5,806,721 A | | 9/1998 | Tada | 222/153.13 |
| 6,279,785 B1 | * | 8/2001 | Bonningue | 222/321.7 |
| 6,422,434 B1 | | 7/2002 | Lammond Wass et al. | 222/571 |
| 6,446,840 B2 | * | 9/2002 | Ophardt et al. | 222/190 |
| 6,547,162 B1 | * | 4/2003 | de Regt et al. | 239/333 |
| 6,651,851 B2 | * | 11/2003 | Muderlak et al. | 222/333 |
| 7,004,356 B1 | * | 2/2006 | Sayers | 222/137 |

* cited by examiner

*Primary Examiner*—Lien T Ngo
(74) *Attorney, Agent, or Firm*—Renner, Kenner, Greive, Bobak, Taylor & Weber

(57) ABSTRACT

A dispenser for dispensing a soap product includes a soap pump, a dispensing nozzle, and an expandable and contractible suction chamber. The dispensing nozzle has an outlet for dispensing soap, and the suction chamber is disposed between the soap pump and the dispensing nozzle. The suction chamber is expandable and contractible in volume and is predisposed to an expanded volume. Actuation of the soap pump causes the suction chamber to contract to a contracted volume that is less than the expanded volume to which it is predisposed, and soap is forced through the suction chamber and the dispensing nozzle to the outlet where it is dispensed. Soap that has not been dispensed at the outlet resides in the dispensing nozzle after actuation of the soap pump, and this residual soap is sucked back into the suction chamber during a return of the suction chamber to the expanded volume to which it is predisposed.

5 Claims, 2 Drawing Sheets ific design of a dispenser for dispensing a soap
DISPENSER WITH SUCTION CHAMBER

TECHNICAL FIELD

The present invention generally relates to liquid dispensers. The particular focus is on soap and hand sanitizer dispensers, although the dispenser may have applications elsewhere. More particularly, the present invention relates to a liquid dispenser having a suction chamber that serves to draw residual product back into internal elements of the dispenser to avoid dripping and other problems.

BACKGROUND OF THE INVENTION

The dispensers in which the present invention will find application are generally known. They consist of a reciprocating piston that is manipulated by the user to force a liquid, or in some cases foam, product through a dispensing nozzle and out an outlet thereof. When the product is dispensed in this manner, a string of the product remains in the path through which the product was forced, and, particularly in certain dispenser configurations, this string of product can undesirably drip out of the dispensing nozzle. For example, most wall-mounted soap (or foamed soap) dispensers dispense the soap product through a downwardly extending dispensing nozzle, and the string of soap left in the dispensing nozzle might drip onto the floor or counter over which the dispenser is mounted. This not only wastes product, but is also undesirably messy.

Although dispensers are currently provided with so-called "suck back" or "back suction" features that function to draw the string of product out of the dispensing nozzle and into the more internal elements of the pump, there exists a need for a more efficient design of a dispenser for dispensing a soap product and drawing non-dispensed product back into the pump where it cannot cause dripping and other problems. In many of the existing dispensers that have a back suction feature, the suction element (i.e., the element(s) effecting the back suction feature) is in series with the pump piston, and a relatively large stroke length is necessary to actuate both the suction element and the piston. Also, in some dispensers employing a mesh screen to produce a foamed product, the residual foam product string in the dispensing nozzle is sucked back through the mesh screen to a location where foam is created in the next dispensing operation. Such configurations require the use of strong biasing members (e.g., spring bias on the piston) to pull the string or portion thereof through the mesh, and foam sucked back to the location of foam creation can compromise the integrity of the foam created in a subsequent dispensing. More efficient designs are needed to avoid the long stroke length and poor foam quality problems of the prior art, and this invention is directed toward alleviating these problems, and, more generally, toward providing a useful dispenser that will provide many benefits over prior art dispensers.

SUMMARY OF THE INVENTION

The present invention provides a dispenser for dispensing a soap product. The dispenser includes a soap pump, a dispensing nozzle, and an expandable and contractible suction chamber. The dispensing nozzle has an outlet for dispensing soap, and the suction chamber is disposed between the soap pump and the dispensing nozzle. The suction chamber is expandable and contractable in volume and is predisposed to an expanded volume. Actuation of the soap pump causes the suction chamber to contract to a contracted volume that is less than the expanded volume to which it is predisposed, and soap is forced through the suction chamber and the dispensing nozzle to the outlet where it is dispensed. Soap that has not been dispensed at the outlet resides in the dispensing nozzle after actuation of the soap pump, and this residual soap is sucked back into the suction chamber during a return of the suction chamber to the expanded volume to which it is predisposed.

In a particular embodiment, the soap pump is a foamed soap pump including an air chamber retaining air; a soap chamber retaining soap; a mix chamber for receiving soap and air; a piston; and an extrusion screen. Actuation of the foamed soap pump forces the piston to move to force air from the air chamber and soap from the soap chamber into the mix chamber to create a foamed soap, and thereafter further force the foamed soap through the extrusion screen, suction chamber and dispensing nozzle to be dispensed at the outlet. The suction chamber, being disposed between the pump and the dispensing nozzle, is more particularly disposed between the extrusion screen and the dispensing nozzle. Upon expansion of the suction chamber, foamed soap residing in the dispensing nozzle is sucked back toward and into the suction chamber, and, as the foamed soap breaks down in a known manner, it is positioned to where it will not drip out of the dispensing nozzle outlet.

PREFERRED EMBODIMENT FOR CARRYING OUT THE INVENTION

The preferred embodiment of this invention is disclosed in the environment of a foamed soap dispenser. But it should be appreciated that this invention is not limited to such an environment, and this invention will have applications in dispensers that dispense liquid soap or hand sanitizers, and may have application in other dispenser environments as well.

Figure 1:
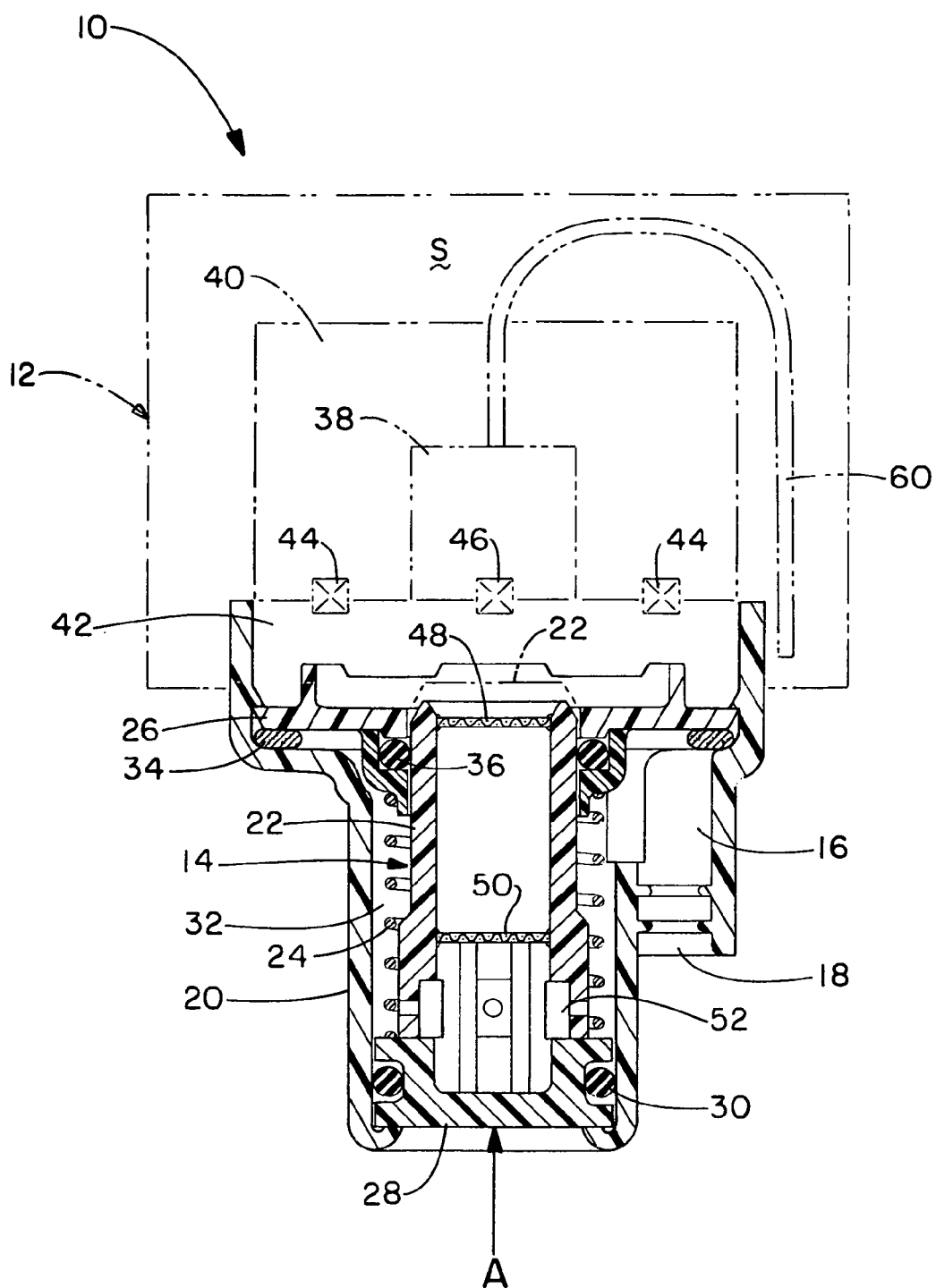
FIG. 1 is a cross-sectional view of an embodiment of a pump mechanism for a dispenser in accordance with this invention.

With reference to FIG. 1, it can be seen that a dispenser in accordance with this invention is shown and designated by the numeral 10. In dispenser 10, certain well-known elements are schematically represented, while those elements more germane to the disclosure of the present invention are represented in more detail. Dispenser 10 includes collapsible container 12, which retains liquid soap S, and foamed soap pump 14 that serves to create foamed soap from the liquid soap S in collapsible container 12 and advance that foamed soap through dispensing nozzle 16 to outlet 18. Foamed soap pump 14 is retained by an outer housing 20 that receives piston 22 of foamed soap pump 14. Piston 22 is predisposed to the position shown in non-phantom in FIG. 1. More particularly, spring 24 is compressed between piston support 26 and end cap 28, which sealingly engages the inside diameter of housing 20, as at O-ring 30. This creates suction chamber 32, which is an annular chamber coaxial with piston 22. Suction chamber 32 is also sealed at piston support 26, gasket 34, and O-ring 36. It will be appreciated that piston 22 may be forced against spring 24 in the direction of arrow A. Forcing piston 22 in this direction will dispense foamed soap at outlet 18.

An appropriate actuation means would be provided in dispenser 10 for forcing piston 22 in the direction of arrow A to dispense foamed soap. Such actuation means are generally known in the art and are not of particular concern in disclosing the present invention. Actuation of foamed soap pump 14 involves moving piston 22 in the direction of arrow A to compress soap chamber 38 and air chamber 40 to force soap retained in soap chamber 38 and air retained in air chamber 40 into mixing chamber 42 through appropriate valves as generally shown at 44 and 46. Liquid soap and air mix in mixing chamber 42 to create foam upstream of an extrusion screen 48 in piston 22. As piston 22 is advanced in the direction of arrow A, foam created in mixing chamber 42 is forced through extrusion screen 48 and the foamed soap is thereby made more uniform and stable. In particularly preferred embodiments, piston 22 provides a second extrusion screen 50 that is opposed to and spaced from screen 48, so that the foam created in foam chamber 42 is passed through two screens before exiting piston 22 at suction chamber inlet 52. The foamed soap created as piston 22 is advanced in the direction of arrow A enters suction chamber 32, and, from suction chamber 32 is forced through dispensing nozzle 16 and dispensed at outlet 18.

Suction chamber 32 is disposed between foamed soap pump 14 and dispensing nozzle 16 and serves to draw foamed soap from dispensing nozzle 16, where it may break down and drip out of outlet 18, into suction chamber 32, where the foamed soap may break down without dripping out of the dispenser. More particularly, actuation of soap pump 14, through the advancement of piston 22 in the direction of arrow A, causes suction chamber 32 to contract to a contracted volume that is less than the expanded volume to which it is predisposed through spring 24. After foamed soap has been dispensed at outlet 18 and the actuation force is removed from piston 22, spring 24 forces piston 22 to its rest position where suction chamber 32 is at its expanded volume. The expansion of suction chamber 32 from its contracted volume to its expanded volume must be accommodated by an influx of air, and this air must come through outlet 18 and dispensing nozzle 16. Thus, as suction chamber 32 expands, it draws air in through outlet 18 and dispensing nozzle 16 and this air forces residual foamed soap in dispensing nozzle 16 into suction chamber 32. More liquid soap is drawn into soap chamber 38 from collapsible container 12 through dip tube 60.

Figure 2:
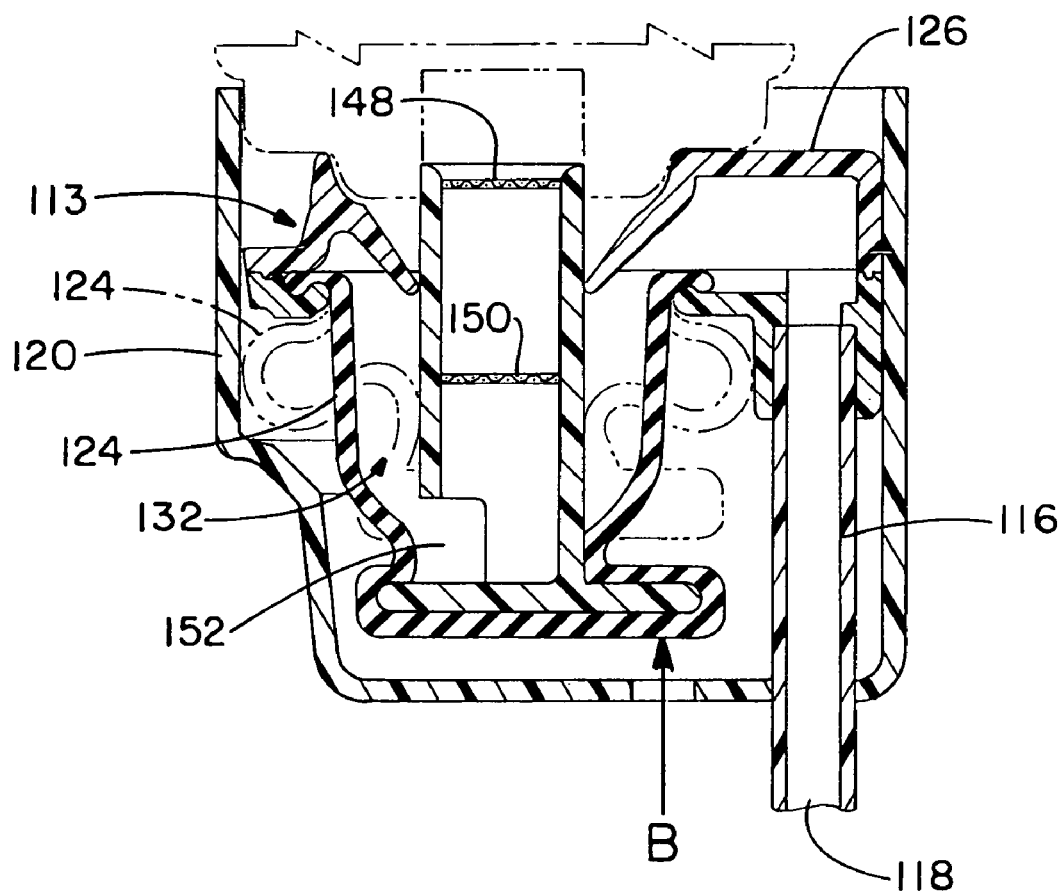
FIG. 2 is a cross-sectional view of an alternative embodiment of a pump mechanism for a dispenser in accordance with this invention.

Referring now to FIG. 2, an alternative embodiment for the piston, suction chamber and dispensing nozzle elements is shown and designated by the numeral 113. In this embodiment, pump mechanisms 113 are secured to outer housing member 120, as at support member 126. Rather than sealingly engaging housing member 114, piston 122 of this embodiment is surrounded by dome diaphragm 124. This diaphragm 124 functions much like spring 24 of the embodiment of FIG. 1, and defines suction chamber 132, between suction chamber inlet 152 and dispensing nozzle 116. As shown in phantom, when piston 122 is advanced in the direction of arrow B through an appropriate actuation mechanism, suction chamber 132 contracts to a contracted volume that is less than the expanded volume it is predisposed to occupy through the resiliency of dome diaphragm 124. Foam forced through the extrusion screens 148, 150 of piston 122 is forced into and through suction chamber 132 and dispensing nozzle 116 to outlet 118. As the actuation force in the direction of arrow B is removed, the resiliency of dome diaphragm 124 returns suction chamber 132 to its expanded volume, and residual foamed soap in dispensing nozzle 116 is drawn back into suction chamber 132.

As already mentioned, this invention is not limited to use for dispensing foamed soap, and may be employed to dispense common liquid soap and hand sanitizers. In a non-foam dispenser, the pump mechanisms would be well known, and would typically not include air or soap chambers or screens. The reciprocating action of the pump piston forces liquid soap (or hand sanitizer) through the suction chamber and dispensing nozzle to the outlet thereof, and also draws more soap from the collapsible container into the pump mechanism. Thus, those of ordinary skill in the art will readily appreciate the application of the invention herein into non-foamed soap dispensers. Additionally, while a collapsible container is preferred, vented, rigid containers may alternatively be employed, as generally known.

In light of the foregoing, it should thus be evident that the present invention substantially improves the art of dispensers having a suck back function. While, in accordance with the patent statutes, only the preferred embodiments of the present invention have been described in detail hereinabove, the present invention is not to be limited thereto or thereby. Rather, the scope of the invention shall include all modifications and variations that fall within the scope of the attached claims.

What is claimed is:

1. A dispenser for dispensing a foamed soap product comprising:
   a foamed soap pump including:
   an air chamber retaining air,
   a soap chamber retaining soap,
   a mixing chamber for receiving soap and air,
   a piston, and
   an extrusion screen;
   a dispensing nozzle having an outlet for dispensing soap;
   a suction chamber that is expandable and contractible in volume and disposed between said foamed soap pump and said dispensing nozzle and predisposed to an expanded volume, wherein actuation of said foamed soap pump forces said piston to move to force air from said air chamber and soap from said soap chamber into said mixing chamber to create a foamed soap, and thereafter further force said foamed soap through said extrusion screen, suction chamber and dispensing nozzle to said outlet to dispense foamed soap, further wherein actuation of said foamed soap pump causes said suction chamber to contract to a contracted volume that is less than said expanded volume and forces soap through said suction chamber and said dispensing nozzle to said outlet to dispense soap, and further wherein soap that has not been dispensed at said outlet resides in said dispensing nozzle after actuation of said foamed soap pump and is sucked back into said suction chamber during a return of said suction chamber to said expanded volume to which it is predisposed.

2. The dispenser of claim 1, wherein said suction chamber is disposed between said extrusion screen and said dispensing nozzle.

3. A dispenser for dispensing a soap product comprising:
   a foamed soap pump including:
   an air chamber retaining air,
   a soap chamber retaining soap,
   a mixing chamber for receiving soap and air,
   a piston, and
   an extrusion screen;
   a dispensing nozzle having an outlet for dispensing soap; and
   a suction chamber that surrounds said piston and expands and contracts in volume according to the movement of said piston, said suction chamber being disposed between said soap pump and said dispensing nozzle and predisposed to an expanded volume, wherein actuation of said soap pump causes said suction chamber to contract to a contracted volume that is less than said expanded volume and forces soap through said suction chamber and said dispensing nozzle to said outlet to dispense soap, and wherein soap that has not been dispensed at said outlet resides in said dispensing nozzle after actuation of said soap pump and is sucked back into said suction chamber during a return of said suction chamber to said expanded volume to which it is predisposed.

4. The dispenser of claim 3, wherein said piston has an axis, and said suction chamber is coaxial with said piston.

5. The dispenser of claim 3, wherein said suction chamber includes a dome diaphragm.

* * * * *